United States Patent
Liu et al.

(10) Patent No.: US 11,763,542 B2
(45) Date of Patent: Sep. 19, 2023

(54) APPARATUS AND METHOD FOR IMAGE CLASSIFICATION AND SEGMENTATION BASED ON FEATURE-GUIDED NETWORK, DEVICE, AND MEDIUM

(71) Applicant: Jiangsu University, Jiangsu (CN)

(72) Inventors: Zhe Liu, Jiangsu (CN); Jie Pang, Jiangsu (CN); Yuqing Song, Jiangsu (CN); Yi Liu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 159 days.

(21) Appl. No.: 17/612,220

(22) PCT Filed: Jan. 29, 2021

(86) PCT No.: PCT/CN2021/074273
§ 371 (c)(1),
(2) Date: Nov. 18, 2021

(87) PCT Pub. No.: WO2022/141723
PCT Pub. Date: Jul. 7, 2022

(65) Prior Publication Data
US 2023/0055256 A1 Feb. 23, 2023

(30) Foreign Application Priority Data
Dec. 29, 2020 (CN) .......................... 202011597039.8

(51) Int. Cl.
*G06V 10/26* (2022.01)
*G06V 10/25* (2022.01)
(Continued)

(52) U.S. Cl.
CPC .......... *G06V 10/267* (2022.01); *G06V 10/247* (2022.01); *G06V 10/25* (2022.01);
(Continued)

(58) Field of Classification Search
CPC .... G06V 10/267; G06V 10/25; G06V 10/247; G06V 10/806; G06V 10/7715;
(Continued)

(56) References Cited

U.S. PATENT DOCUMENTS

| | | | |
|---|---|---|---|
| 2020/0074271 A1* | 3/2020 | Liang | G06V 10/82 |
| 2021/0125338 A1* | 4/2021 | Zhang | G06T 7/11 |

(Continued)

FOREIGN PATENT DOCUMENTS

| | | |
|---|---|---|
| CN | 109614907 | 4/2019 |
| CN | 111932553 | 11/2020 |

OTHER PUBLICATIONS

"International Search Report (Form PCT/ISA/210) of PCT/CN2021/074273," dated Aug. 19, 2021, pp. 1-4.

(Continued)

*Primary Examiner* — Utpal D Shah
(74) *Attorney, Agent, or Firm* — JCIP GLOBAL INC.

(57) ABSTRACT

The present invention provides an apparatus and method for image classification and segmentation based on a feature-guided network, a device, and a medium, and belongs to the technical field of deep learning. A feature-guided classification network and feature-guided segmentation network of the present invention include basic unit blocks. A local feature is enhanced and a global feature is extracted among the basic unit blocks. This resolves a problem that features are not fully utilized in existing image classification and image segmentation network models. In this way, a trained feature-guided classification network and feature-guided segmentation network have better effects and are more robust. The present invention selects the feature-guided classification network or the feature-guided segmentation network based on a requirement of an input image and outputs a corresponding category or segmented image, to (Continued)

resolve a problem that the existing classification or segmentation network model has an unsatisfactory classification or segmentation effect.

9 Claims, 4 Drawing Sheets

(51) Int. Cl.
| | |
|---|---|
| G06V 10/24 | (2022.01) |
| G06V 10/80 | (2022.01) |
| G06V 10/32 | (2022.01) |
| G06V 10/77 | (2022.01) |
| G06V 10/42 | (2022.01) |
| G06V 10/82 | (2022.01) |
| G06V 10/764 | (2022.01) |

(52) U.S. Cl.
CPC .............. *G06V 10/32* (2022.01); *G06V 10/42* (2022.01); *G06V 10/764* (2022.01); *G06V 10/7715* (2022.01); *G06V 10/806* (2022.01); *G06V 10/82* (2022.01)

(58) Field of Classification Search
CPC ........ G06V 10/42; G06V 10/32; G06V 10/82; G06V 10/764
See application file for complete search history.

(56) References Cited

U.S. PATENT DOCUMENTS

| | | | |
|---|---|---|---|
| 2021/0216806 A1* | 7/2021 | Yang | G06V 10/454 |
| 2021/0232860 A1* | 7/2021 | Liu | G06F 18/214 |
| 2021/0248751 A1* | 8/2021 | Guo | G06V 10/764 |
| 2021/0365716 A1* | 11/2021 | Li | G06V 10/764 |
| 2021/0401392 A1* | 12/2021 | Bengtsson | A61B 6/5217 |
| 2021/0407090 A1* | 12/2021 | Li | G06T 7/10 |
| 2022/0230310 A1* | 7/2022 | Xie | G06V 10/758 |
| 2022/0237789 A1* | 7/2022 | Nie | G06V 20/695 |
| 2023/0005140 A1* | 1/2023 | Ferl | G06V 10/774 |

OTHER PUBLICATIONS

"Written Opinion of the International Searching Authority (Form PCT/ISA/237) of PCT/CN2021/074273," dated Aug. 19, 2021, pp. 1-4.

Puyang Wang et al., "Simultaneous Segmentation and Classification of Bone Surfaces from Ultrasound Using a Multi-feature Guided CNN", Medical Image Computing and Computer Assisted Intervention, Sep. 2018, pp. 134-142.

* cited by examiner

APPARATUS AND METHOD FOR IMAGE CLASSIFICATION AND SEGMENTATION BASED ON FEATURE-GUIDED NETWORK, DEVICE, AND MEDIUM

CROSS-REFERENCE TO RELATED APPLICATION

This application is a 371 of international application of PCT application serial no. PCT/CN2021/074273, filed on Jan. 29, 2021, which claims the priority benefit of China application no. 202011597039.8, filed on Dec. 29, 2020. The entirety of each of the above mentioned patent applications is hereby incorporated by reference herein and made a part of this specification.

TECHNICAL FIELD

The present invention relates to the field of deep learning, and in particular, to application of convolutional neural networks in image classification and segmentation in deep learning.

DESCRIPTION OF RELATED ART

Image classification and image segmentation are two major tasks in the field of computer vision. Image classification is to determine a specific category of a given image. Image segmentation is to segment a given image to obtain a target that contains only a region of interest.

The field of image classification mainly involves traditional machine learning algorithms and currently popular deep learning methods. Machine learning algorithms often require manual feature design and manual intervention, while deep learning methods have a powerful ability to automatically extract features and are widely studied. More importantly, convolutional neural networks in deep learning make effects of deep learning methods in the field of image classification much better than those of traditional machine learning algorithms. However, the existing image classification network model does not fully utilize fine features from an original input to a model output, resulting in relatively low classification accuracy. This is mainly because the currently designed classification network model fails to achieve sufficient feature guidance, enhancement, and utilization.

Image segmentation is classified into semantic segmentation and instance segmentation. Semantic segmentation is to segment a given image to obtain targets of different categories, while instance segmentation is to segment a given image to obtain targets of different categories and further different objects of a same category. In the field of image segmentation, convolutional neural networks have also achieved desired effects. A milestone is a fully convolutional network for semantic segmentation proposed in 2015. The fully convolutional network does not contain a fully-connected layer so as to adapt to inputs of any size, and adopts a deconvolution operation and skip structure to output finer results. The fully convolutional network has been continuously improved and widely used in the field of image segmentation due to its good design concept. Image segmentation is essentially pixel-level image classification. Therefore, it is particularly important for image segmentation networks to implement fine feature extraction. However, most existing image segmentation network models ignore a more intensive feature extraction method and full reuse of features after convolution, such as feature enhancement during encoding and feature utilization during decoding.

SUMMARY

In view of the shortcomings in the prior art, the present invention provides an apparatus and method for image classification and segmentation based on a feature-guided network, a device, and a medium to resolve a problem that an existing classification or segmentation network model has an unsatisfactory classification or segmentation effect.

The present invention adopts the following technical solution to achieve the foregoing objective.

A method for image classification and segmentation based on a feature-guided network includes: choosing whether to classify or segment an input image based on a requirement of the input image, and if choosing to classify the image, inputting the image to a trained classification network model and outputting a corresponding category; or if choosing to segment the image, inputting the image to a trained segmentation network model and outputting a segmented image.

The classification network model is a feature-guided classification network. The input image is processed by one 3×3 convolutional layer, and then five basic unit blocks and downsampling layers. Finally, an obtained output feature map is flattened and connected to a fully-connected network. Residual connections are added before and after each basic unit block. A local feature is enhanced in a spatial dimension and a global feature is extracted in a channel dimension for an output feature map generated by each basic unit block. The global feature and local feature are fused before a fully-connected layer.

The segmentation network model is a feature-guided segmentation network, adopting an encoder-decoder structure. In the encoder, the input image is processed by one 3×3 convolution layer, then four basic unit blocks and downsampling layers, and finally one basic unit block and a rectified linear unit (ReLU) activation function. Residual connections are added before and after each basic unit block. The local feature is enhanced in the spatial dimension and the global feature is extracted in the channel dimension for an output feature map generated by each basic unit block. In the decoder, an output feature map generated by the ReLU activation function is input into the decoder, the output feature map generated by each basic unit block in the encoder and a feature map generated by each upsampling layer in the decoder with a corresponding scale are connected in the channel dimension, then regular convolution is performed, a generated output feature map is used as an input feature map of a next upsampling layer, and the segmented image is output until fifth upsampling and fifth regular convolution are performed on an output feature map generated after fourth regular convolution.

Further, the basic unit block adopts four parallel horizontal channels. Each horizontal channel adopts a different number of convolution operations. Feature maps are connected such that features among the channels are fused. Residual connections are added to a same channel and different channels such that fusion of similar features on the same channel and fusion of features among different channels are enhanced.

Further, the convolution operation is designed as a depthwise separable convolution operation.

Further, enhancing the local feature in the spatial dimension specifically includes: performing global average pooling (GAP) on the output feature map of each basic unit block to obtain an eigenvector, performing a dot-product operation on the original output feature map of the basic unit block and the eigenvector to obtain an enhanced output feature map, using the enhanced feature map as an input of a next basic unit block, performing GAP on an enhanced output feature map of the last basic unit block, and using an obtained feature map as an input of the fully-connected network.

Further, extracting the global feature in the channel dimension specifically includes: compressing a multi-channel output feature map generated by each basic unit block to extract a single-channel global output feature map.

Further, a region of interest is cut out before the image is input.

Further, before the image is input, various affine transformation operations and normalization are performed on the input image.

An apparatus for image classification and segmentation based on a feature-guided network includes:

a data preprocessing module, configured to perform various affine transformation operations and normalization on an input image;

an image classification module, configured to construct a feature-guided classification network, wherein the feature-guided classification network includes one 3×3 convolutional layer, five basic unit blocks, and a fully-connected network; and an image segmentation module, configured to construct a feature-guided segmentation network, wherein the feature-guided segmentation network adopts an encoder-decoder structure; the encoder includes one 3×3 convolutional layer, four basic unit blocks and downsampling layers, and one basic unit block and a ReLU activation function; and the decoder includes five upsampling layers and regular convolutional layers.

A computer device includes a processor and a memory; the memory is configured to store a computer program; the processor is configured to execute the computer program to implement the method for the image classification and segmentation.

A computer-readable storage medium is provided. The computer-readable storage medium stores a computer program. When the computer program is executed by a processor, the processor implements the method for the image classification and segmentation.

The present invention has the following beneficial effects:

(1) The basic unit block in the present invention adopts four parallel horizontal channels. Each horizontal channel adopts a different number of convolution operations. Feature maps are connected such that features among the channels are fused. Residual connections are added to a same channel and different channels such that fusion of similar features on the same channel and that of features on different channels are enhanced. The local feature is enhanced and the global feature is extracted among the basic unit blocks such that the trained feature-guided classification network and feature-guided segmentation network have better effects and are more robust.

(2) The feature-guided classification network in the present invention includes one 3×3 convolution layer, five basic unit blocks, and a fully-connected network. Residual connections are added before and after each basic unit block, and logically form a whole together with horizontal residual connections inside each basic unit block. This makes training of the feature-guided classification network easier.

The feature-guided segmentation network in the present invention adopts an encoder-decoder structure. The encoder includes one 3×3 convolution layer, four basic unit blocks and downsampling layers, one basic unit block and a ReLU activation function. The decoder includes five upsampling layers and regular convolution layers. Residual connections are added before and after each basic unit block, and logically form a whole together with horizontal residual connections inside each basic unit block. This facilitates training of the feature-guided segmentation network.

The present invention selects the feature-guided classification network or feature-guided segmentation network based on the requirement of the input image and outputs the corresponding category or segmented image, to resolve the problem that the existing classification or segmentation network model has an unsatisfactory classification or segmentation effect because features are not fully utilized.

DESCRIPTION OF EMBODIMENTS

The present invention will be further described with reference to the accompanying drawings and embodiments, but the protection scope of the present invention is not limited thereto.

Figure 1:
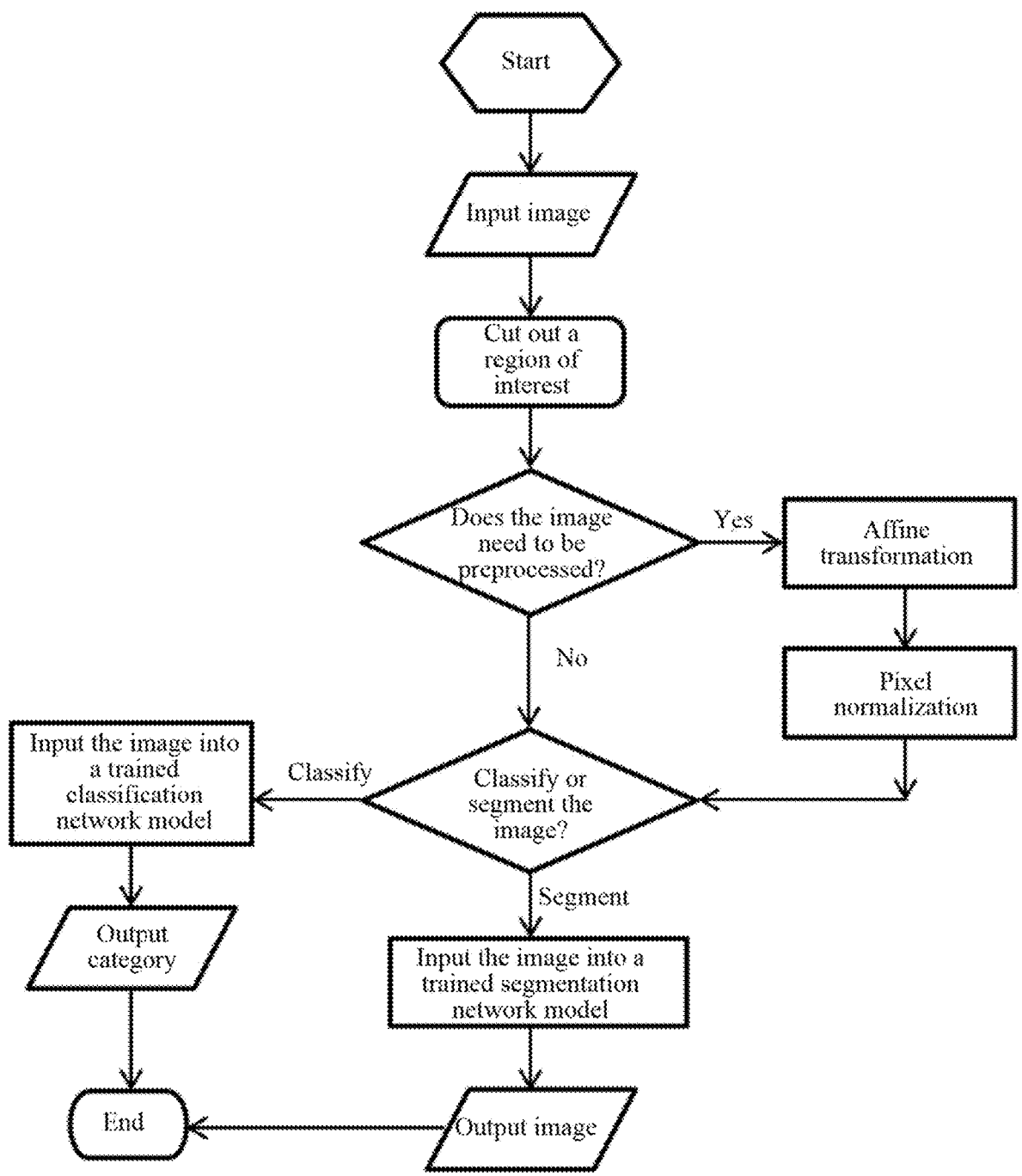
FIG. 1 is a flowchart of a method for image classification and segmentation based on a feature-guided network according to the present invention.

As shown in FIG. 1, a method for image classification and segmentation based on a feature-guided network specifically includes the following steps.

Step (1). A region of interest from an input image is cut out.

Due to uncertainty of a classification or segmentation dataset, the operation of cutting out of the region of interest is optional whether for a classification network or segmentation network. In some application fields that have relatively high requirements for classification or segmentation results, cutting out the region of interest and training only the region of interest in an image can make a classifier or segmentation model achieve better effects. Generally, a square target of interest is cut out from an input image by using Python code.

Step (2). The input image is preprocessed.

Convolutional neural networks often require a large amount of data for training. If the amount of data is too small, overfitting may occur. To prevent overfitting of the feature-guided network, various affine transformation operations need to be performed on the input image. The affine transformation operations specifically include random horizontal flipping, random angle rotation, random vertical flipping, and mapping to a specific size. In addition, to normalize the input of the network, normalization (such as subtracting an average value of the input image by channel, and then dividing a value obtained after the subtraction by a standard deviation of the input image) or min-max normalization further needs to be performed on the input image. This avoids that the feature-guided network needs to learn a deviation between data during training.

Step (3). A feature-guided classification network is constructed and trained.

The feature-guided network for image classification is an end-to-end network model. The preprocessed input image needs to be used as an input of the feature-guided classification network to generate output vectors that meet a specific number of categories. After the feature-guided classification network receives the input image, each basic unit block in the network guides learning of features, and the features are enhanced in a space dimension and utilized in a channel dimension between the unit blocks. A local feature is enhanced in the spatial dimension to facilitate learning for subsequent unit blocks. A global feature is extracted between the unit blocks in the channel dimension and used as an input of a final fully-connected layer to improve performance of the feature-guided classification network.

Figure 3:
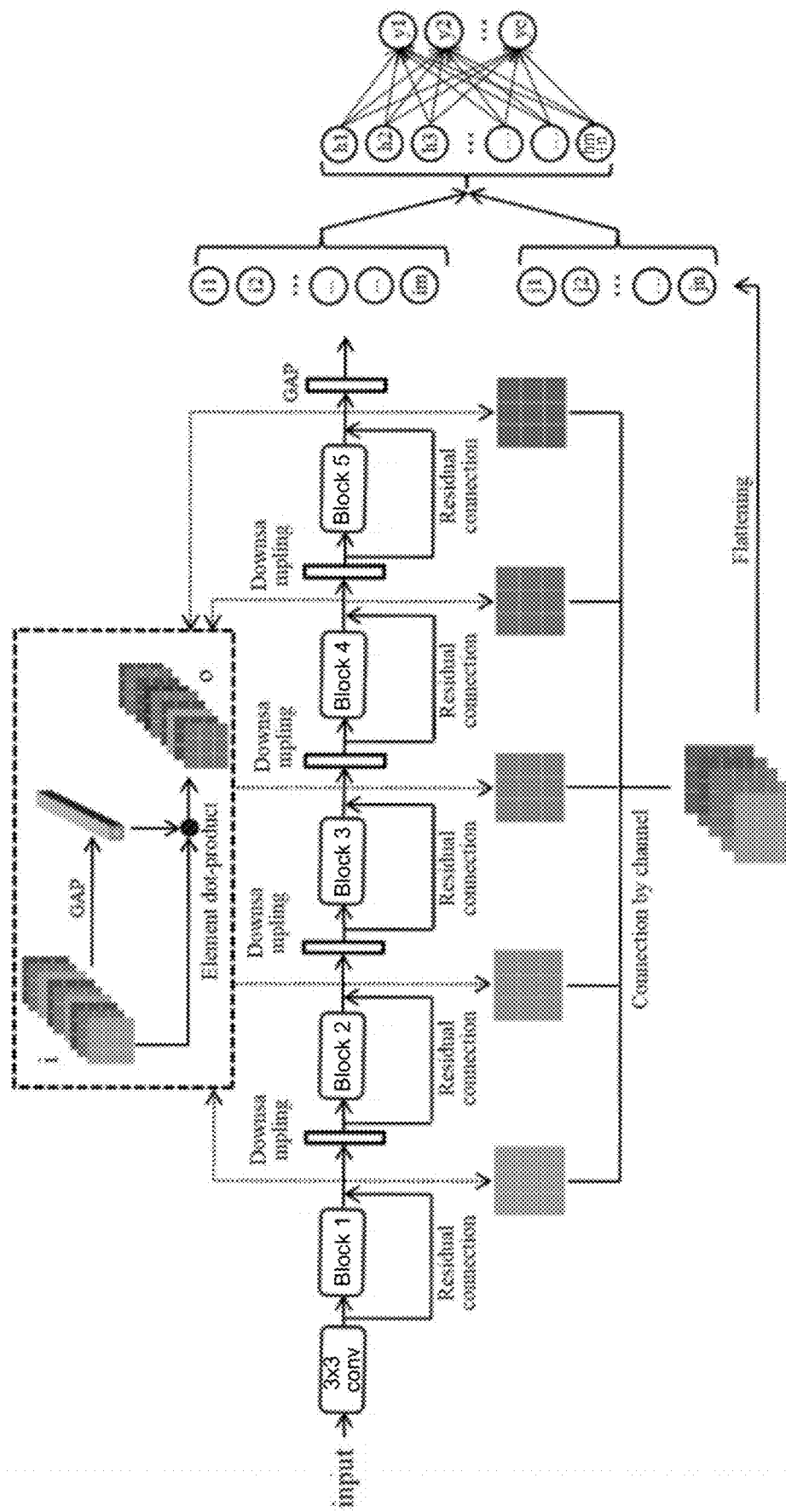
FIG. 3 is an overall structural diagram of a feature-guided classification network according to the present invention.

FIG. 3 shows an overall structure of the feature-guided classification network. The network includes a plurality of basic unit blocks connected in series. The local feature is enhanced between the unit blocks in the spatial dimension, and the global feature is extracted and utilized between the unit blocks in the channel dimension. The global feature and local feature are fused before the final fully-connected layer. The feature-guided classification network is an end-to-end network, using the following multi-class cross-entropy loss function:

$$L(\theta) = \frac{1}{n}\sum_{i=1}^{n}\sum_{k} -y_k \log(S(l_k))$$

wherein i represents a sample (the input image), n represents a total number of samples, θ represents a model parameter, k represents a number of categories, $y_k$ represents a real value of the sample, S(•) represents a softmax operation, and $l_k$ represents a predicted output category score.

(1) Basic Unit Block

Figure 2:
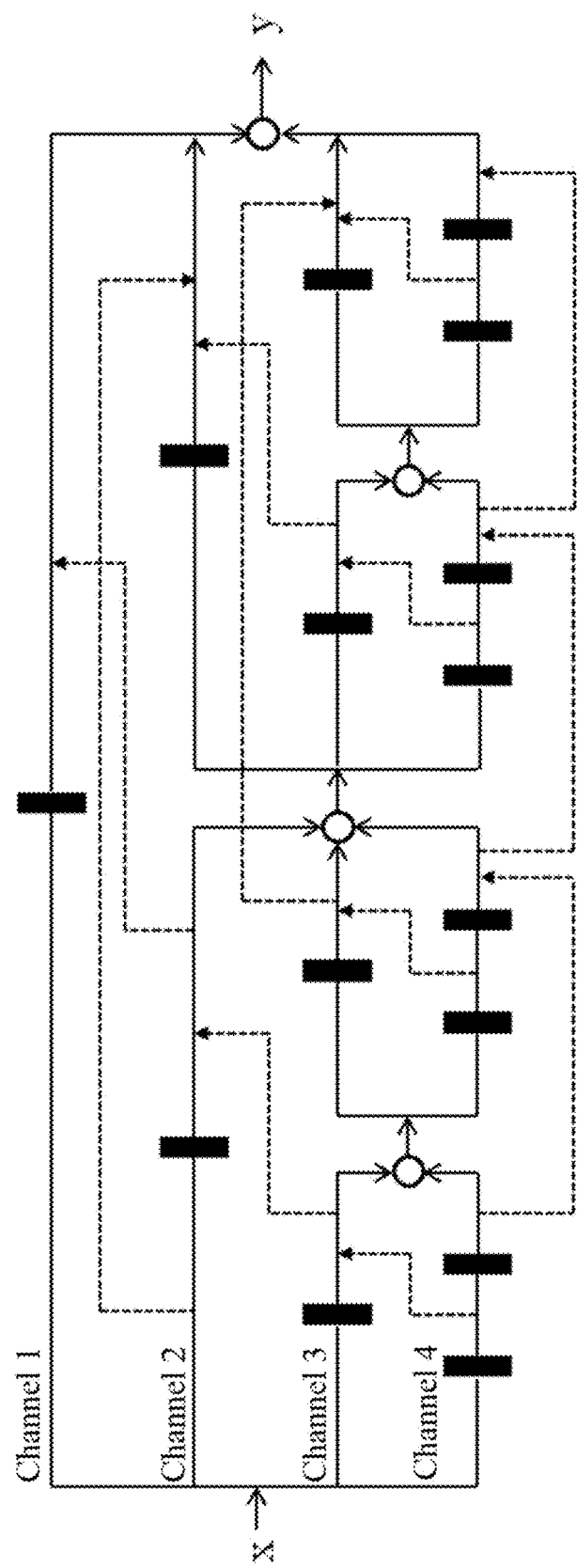
FIG. 2 is a structural diagram of a basic unit block according to the present invention.

FIG. 2 shows the basic unit block in the present invention. Bars represent convolution operations, solid lines represent flow directions of data, dashed lines represent residual connections, and circles represent connections of feature maps. The basic unit block adopts four parallel horizontal channels. Each horizontal channel adopts a different number of convolution operations, from top to bottom, 1, 2, 4, and 8, respectively, to form branches of different depths in the entire feature-guided classification network. To fuse the features among the channels, the connections of the feature maps (fusion of features between the channels 4 and 3, fusion of features among the channels 4, 3, and 2, and fusion of features among the channels 4, 3, 2, and 1) are added. The connections of the feature maps can be considered as serial arrangement of the features such that subsequent convolutional layers can learn the previous features. To further enhance fusion of similar features on a same channel and features among different channels, the residual connections are added to the same channel and different channels. The residual connections can enhance feature representation to some extent such that the designed network model can be deeper, and training a deep network becomes easier.

To reduce the number of parameters of the network and improve computing performance of the network, all convolution operations in the basic unit block are designed as depthwise separable convolution operations. The depthwise separable convolution operation is to first use a single-channel convolution kernel to keep the number of output temporary feature maps the same as that of input feature maps, and then use a 1*1 convolution kernel to reduce the number of input channels, so as to reduce the number of parameters and improve execution efficiency of the network.

(2) Feature-Guided Classification Network

As shown in FIG. 3, a given input image is processed by one 3×3 convolution layer, and then five basic unit blocks and downsampling layers. Finally, an obtained feature map is flattened and connected to a fully-connected network. Residual connections are added before and after each basic unit block, and logically form a whole together with horizontal residual connections inside each basic unit block. The residual connections make horizontally extracted features more hierarchical and facilitate training of the classification network. To enhance features extracted by each basic unit block, the following operations are performed on an output feature map generated by each basic unit block: GAP is performed on the output feature map generated by each basic unit block to obtain an eigenvector. Then, a dot-product operation is performed on an original output feature map i of the basic unit block and the eigenvector to obtain an enhanced output feature map o. The enhanced feature map o is used as an input of a next basic unit block. GAP is performed on an enhanced output feature map of the last basic unit block, to obtain i1, i2, . . . , and im. In addition to this method of enhancing the local feature in the spatial dimension, the global feature is extracted for the output feature map generated by each basic unit block. The operation is as follows: In the channel dimension, the multi-channel output feature map generated by each basic unit block is compressed to extract a single-channel global output feature map. The foregoing operation is performed on the output feature maps of the five basic unit blocks to obtain five global feature maps with different semantics. The five global output feature maps are connected in the channel dimension, flattened (j1, j2, . . . , and jn), and then connected to i1, i2, . . . , and im, together as an input neuron of the final fully-connected network.

(3) Training of the Feature-Guided Classification Network

The feature-guided classification network is trained by using a stochastic gradient descent method, and a weight attenuation value is set to 0.0001. The multi-class cross-entropy loss function is used. A back propagation algorithm is used to calculate a gradient. Because the number of parameters of the deep convolutional neural network is relatively large, and the training is relatively time-consuming, the network is trained on an NVIDIA GeForce GTX 1080 Ti graphics processing unit (GPU) in the present invention. In addition, to further prevent overfitting, a dropout layer is added after each basic unit block, and a dropout rate is set to 0.2.

Step (4). A feature-guided segmentation network is constructed and trained.

The image segmentation network adopts an encoder-decoder structure. The encoder includes basic unit blocks and downsampling layers. The decoder includes upsampling layers. The global features extracted among the unit blocks of the encoder are connected to enhance semantic features in the decoder. The image segmentation network in the present invention is a single-stage network. The preprocessed image is used as an input of the segmentation network to generate an output image obtained after semantic segmentation.

Figure 4:
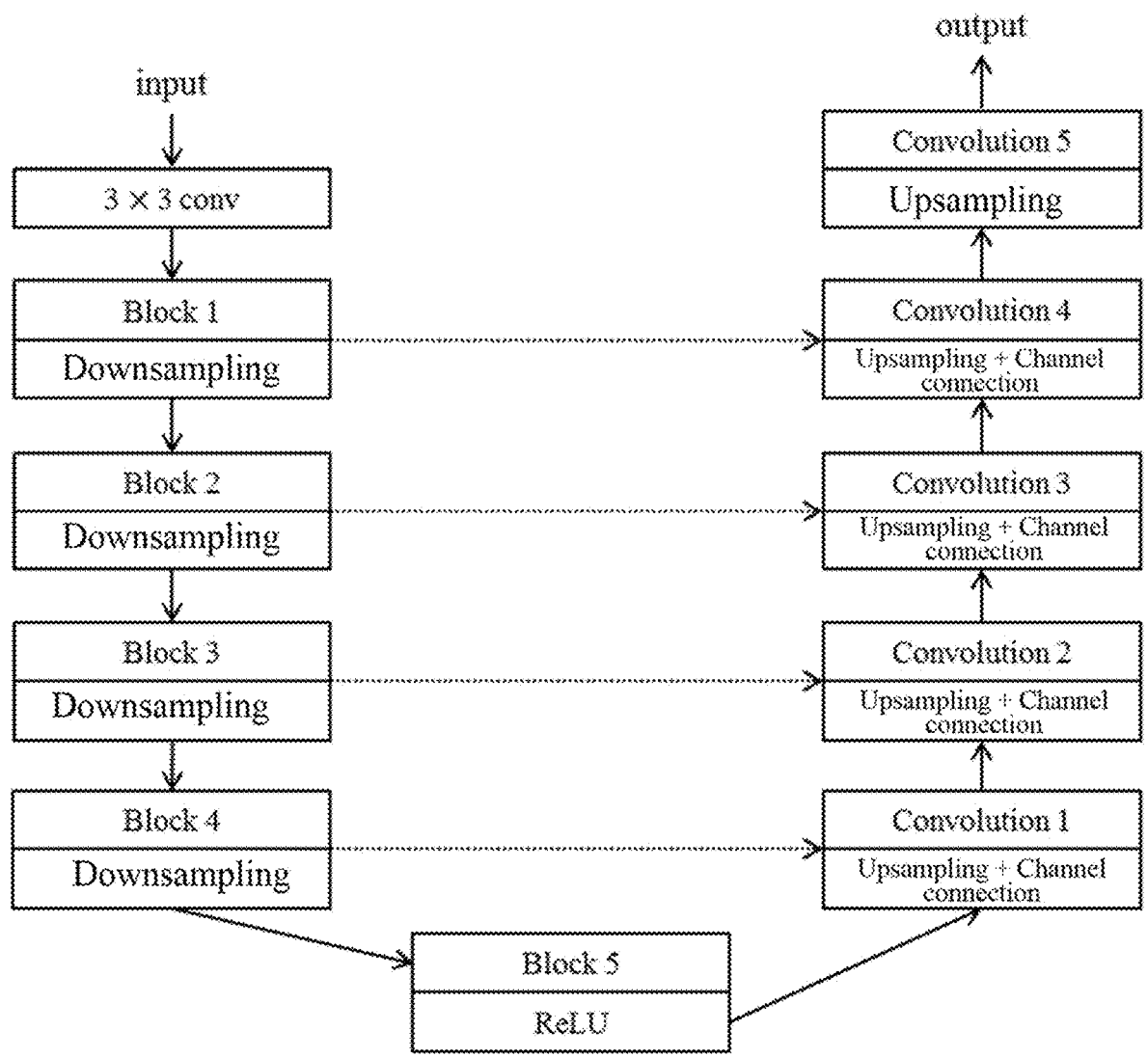
FIG. 4 is an overall structural diagram of a feature-guided segmentation network according to the present invention.

FIG. 4 shows an overall structure of the feature-guided segmentation network in the present invention. The network adopts the encoder-decoder structure. The encoder adopts a structure similar to the feature-guided classification network. Specifically, basic unit blocks are used as a basic structure of the encoder. Similarly, a local feature is enhanced and a global feature is extracted among the basic unit blocks. The feature-guided segmentation network is a single-stage network, using the following loss function:

$$L(\theta) = \begin{cases} \frac{1}{n}\sum_{i=1}^{n} -(y_k \log(\sigma(l_k)) + (1-y_k)\log(1-\sigma(l_k))), & k \le 1 \\ \frac{1}{n}\sum_{i=1}^{n}\sum_{k} -y_k \log(S(l_k)), & k > 1 \end{cases}$$

wherein i represents a sample, n represents a total number of samples, θ represents a model parameter, k represents a number of categories, $Y_k$ represents a real value of the sample, σ(•) represents a sigmoid operation, S(•) represents a softmax operation, and $l_k$ represents a predicted output category score.

(1) Feature-Guided Segmentation Network

As shown in FIG. 4, in the encoder of the network, a given input image is processed by one 3×3 convolution layer, then four basic unit blocks and downsampling layers, and finally one basic unit block and a ReLU activation function. Residual connections are added before and after each basic unit block for residual learning. The same local feature enhancement method as that used in the feature-guided classification network is used for an output feature map of each unit block, to facilitate feature learning for a next basic unit block. In addition, the output feature map generated by each basic unit block is compressed in the channel dimension to obtain a global output feature map, which is used for semantic enhancement in the decoder of the segmentation network. In the decoder, upsampling and regular convolution are performed five times for semantic feature restoration. An output of the last basic unit block in the encoder is processed by the ReLU activation function. Then, a generated feature map is used as an input of the decoder. First, after upsampling of bilinear interpolation, the output feature map generated by the basic unit block 4 in the encoder is connected. Then, regular convolution is performed. By analogy, upsampling and fifth regular convolution are performed on an output feature map generated after fourth regular convolution, to generate a final category output of the segmentation model. The generated category result of each pixel is used as a segmentation result of the input image.

(2) Training of the Feature-Guided Segmentation Network

The feature-guided segmentation network is trained by using an RMSprop gradient descent method, a weight attenuation value is set to 1e-8, and a momentum is set to 0.9. According to different segmentation categories, sigmoid and a two-class cross-entropy can be combined as the loss function, or a multi-class cross-entropy loss function can be used. A back propagation algorithm is used to calculate a gradient. Like the feature-guided classification network, the segmentation network is trained on an NVIDIA GeForce GTX 1080 Ti GPU in the present invention. In addition, to further prevent overfitting, a dropout layer is added after each basic unit block in the encoder, and a dropout rate is set to 0.2.

Step (5). A category and segmentation result is predicted.

The models and parameters of the foregoing trained classification network and segmentation network are saved, and a category or segmentation result of an image is predicted based on a requirement. An image to be classified or segmented is input. Optionally, a region of interest is cut out from the image and the image is preprocessed. Then, whether to classify or segment the image is determined based on a requirement. If it is determined to classify the image, the image is input into the trained classification network model. If it is determined to segment the image, the image is input into the trained segmentation network model. Finally, a corresponding category or segmented image is output.

An apparatus for image classification and segmentation based on a feature-guided network includes a data preprocessing module, an image classification module, and an image segmentation module;

the data preprocessing module is configured to perform various affine transformation operations and normalization on an input image to prevent overfitting of the feature-guided network;

the image classification module is configured to construct a feature-guided classification network. The feature-guided classification network includes one 3×3 convolution layer, five basic unit blocks, and a fully-connected network. Residual connections are added before and after each basic unit block. A local feature is enhanced in a spatial dimension and a global feature is extracted in a channel dimension for an output feature map generated by each basic unit block;

the image segmentation module is configured to construct a feature-guided segmentation network. The feature-guided segmentation network adopts an encoder-decoder structure. The encoder includes one 3×3 convolutional layer, four basic unit blocks and downsampling layers, and one basic unit block and a ReLU activation function. The decoder includes five upsampling layers and five regular convolutional layers. Residual connections are added before and after each basic unit block. A local feature is enhanced in the spatial dimension and a global feature is extracted in the channel dimension for an output feature map generated by each basic unit block.

The foregoing apparatus for image classification and segmentation based on a feature-guided network may be implemented in a form of a computer program. The computer program may run on a computer device. The computer device may be a server or a terminal. The server may be an independent server or a server cluster. The terminal may be an electronic device such as a mobile phone, a tablet computer, a notebook computer, a desktop computer, a personal digital assistant, or a wearable device.

The computer device includes a processor, a memory, and a network interface connected by using a system bus. The memory may include a non-volatile storage medium and an internal memory. The non-volatile storage medium may store an operating system and a computer program. The computer program includes a program instruction. When the program instruction is executed, the processor executes any method for image classification and segmentation based on a feature-guided network. The processor is configured to provide computing and control capabilities to support the operation of the entire computer device. The memory provides an environment for the operation of the computer program in the non-volatile storage medium. When the computer program is executed by the processor, the processor executes any method for image classification and segmentation based on a feature-guided network. The network interface is used for network communication, such as sending assigned tasks.

It should be understood that the processor may be a central processing unit (CPU), another general purpose processor, a digital signal processor (DSP), an application-specific integrated circuit (ASIC), a field-programmable gate array (FPGA) or another programmable logic device, a discrete gate, a transistor logic device, or a discrete hardware component. The general purpose processor may be a microprocessor, or the processor may be any conventional processor or the like.

An embodiment of this application further provides a computer-readable storage medium. The computer-readable storage medium stores a computer program. The computer program includes a program instruction. The processor executes the program instruction to implement the method for image classification and segmentation based on a feature-guided network in this application.

The computer-readable storage medium may be an internal storage unit of the computer device described in the foregoing embodiment, such as a hard disk or memory of the computer device. The computer-readable storage medium may alternatively be an external storage device of the computer device, such as a plug-in hard disk, a SmartMedia card (SMC), a secure digital (SD) card, or a flash card equipped on the computer device.

The foregoing embodiments are preferred implementations of the present invention, but the present invention is not limited to the foregoing implementations. Any obvious improvement, substitution, or modification made by those skilled in the art without departing from the essence of the present invention should fall within the protection scope of the present invention.

What is claimed is:

1. A method for image classification and segmentation based on a feature-guided network, characterized by comprising: choosing whether to classify or segment an input image based on a requirement of the input image, and if choosing to classify the image, inputting the image to a trained classification network model and outputting a corresponding category; or if choosing to segment the image, inputting the image to a trained segmentation network model and outputting a segmented image; wherein the classification network model is a feature-guided classification network: the input image is processed by one 3×3 convolutional layer, and then five basic unit blocks and downsampling layers, and finally, an obtained output feature map is flattened and connected to a fully-connected network; residual connections are added before and after each basic unit block; and a local feature is enhanced in a spatial dimension and a global feature is extracted in a channel dimension for an output feature map generated by each basic unit block, and the global feature and local feature are fused before a fully-connected layer; and the segmentation network model is a feature-guided segmentation network, adopting an encoder-decoder structure; in the encoder, the input image is processed by one 3×3 convolution layer, then four basic unit blocks and downsampling layers, and finally one basic unit block and a rectified linear unit (ReLU) activation function; residual connections are added before and after each basic unit block; the local feature is enhanced in the spatial dimension and the global feature is extracted in the channel dimension for an output feature map generated by each basic unit block; and in the decoder, an output feature map generated by the ReLU activation function is input into the decoder, the output feature map generated by each basic unit block in the encoder and a feature map generated by each upsampling layer in the decoder with a corresponding scale are connected in the channel dimension, then regular convolution is performed, a generated output feature map is used as an input feature map of a next upsampling layer, and the segmented image is output until fifth upsampling and fifth regular convolution are performed on an output feature map generated after fourth regular convolution.

2. The method for the image classification and segmentation based on the feature-guided network according to claim 1, wherein the basic unit block adopts four parallel horizontal channels, and each horizontal channel adopts a different number of convolution operations; feature maps are connected such that features among the channels are fused; and residual connections are added to a same channel and different channels such that fusion of similar features on the same channel and fusion of features among different channels are enhanced.

3. The method for the image classification and segmentation based on the feature-guided network according to claim 1, wherein the convolution operation is designed as a depthwise separable convolution operation.

4. The method for the image classification and segmentation based on the feature-guided network according to claim 1, wherein enhancing the local feature in the spatial dimension specifically comprises: performing global average pooling (GAP) on the output feature map of each basic unit block to obtain an eigenvector, performing a dot-product operation on the original output feature map of the basic unit block and the eigenvector to obtain an enhanced output feature map, using the enhanced feature map as an input of a next basic unit block, performing GAP on an enhanced output feature map of the last basic unit block, and using an obtained feature map as an input of the fully-connected network.

5. The method for the image classification and segmentation based on the feature-guided network according to claim 1, wherein extracting the global feature in the channel dimension specifically comprises: compressing a multi-channel output feature map generated by each basic unit block to extract a single-channel global output feature map.

6. The method for the image classification and segmentation based on the feature-guided network according to claim 1, wherein a region of interest is cut out before the image is input.

7. The method for the image classification and segmentation based on the feature-guided network according to claim 1, wherein before the image is input, affine transformation and normalization are performed on the input image.

8. A computer device, characterized by comprising a processor and a memory; wherein
the memory is configured to store a computer program; and
the processor is configured to execute the computer program to implement the method for the image classification and segmentation according to claim 1.

9. A non-transitory computer-readable storage medium, characterized in that the computer-readable storage medium stores a computer program, and when the computer program is executed by a processor, the processor implements the method for the image classification and segmentation according to claim 1.

* * * * *